Jan. 9, 1962 S. C. PEPLIN 3,016,161
FLEXIBLE FILLER TUBE ASSEMBLY
Filed Aug. 8, 1958
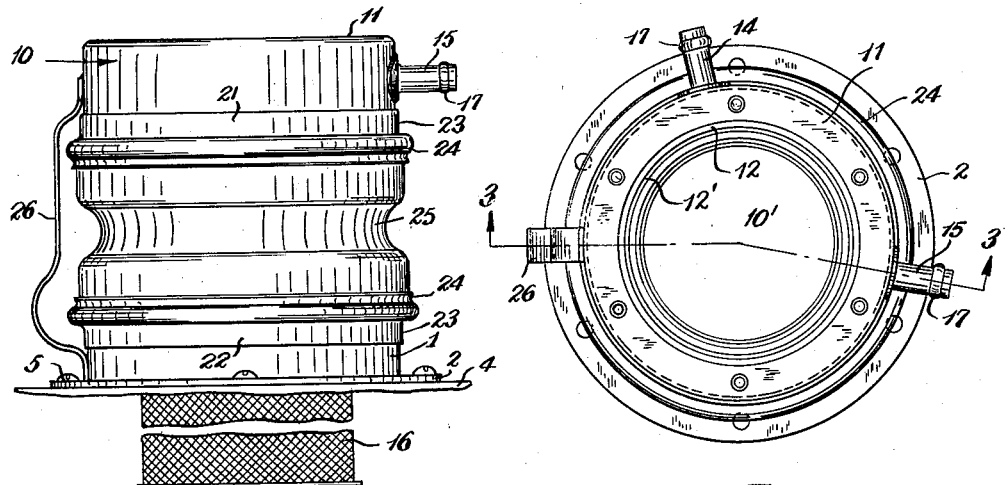
FIG. 1
FIG. 2
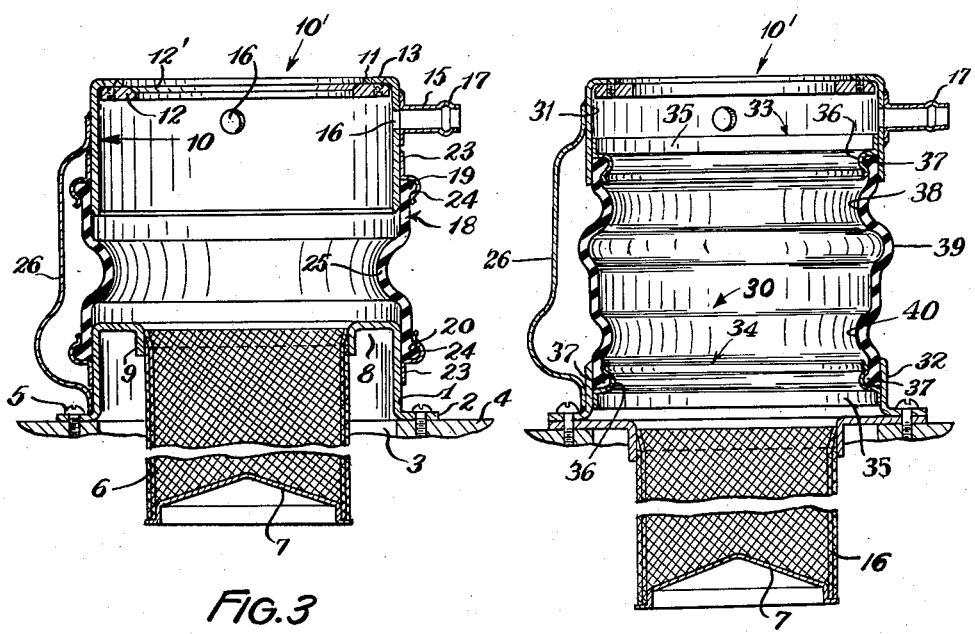
FIG. 3
FIG. 4
INVENTOR.
STEPHEN C. PEPLIN
BY
ATTORNEY

United States Patent Office 3,016,161
Patented Jan. 9, 1962

3,016,161
FLEXIBLE FILLER TUBE ASSEMBLY
Stephen C. Peplin, Lakewood, Cleveland, Ohio, assignor to Lakewood Manufacturing Co., Westlake, Ohio, a corporation of Ohio
Filed Aug. 8, 1958, Ser. No. 753,954
2 Claims. (Cl. 220—86)

This invention relates to flexible filler tube assemblies adapted to be mounted on a liquid storage container in an opening therein whereby liquid fuel, such as gasolene, or even other liquids, may be fed from a source of supply to the interior of the storage container. More particularly, the invention relates to a flexible filler construction which is especially well adapted for assembly on the fuel storage tank of vehicles, such as trucks, armoured cars and military vehicles.

One of the objects of this invention is to provide a filler tube assembly which may readily be removably attached to a fuel storage tank in the filler opening therein and which comprises upper and lower rigid sections and an intermediate flexible section.

Another object of the invention is a device of the kind described which is simple of construction and which is durable in use, yet which also provides a desirable degree of flexibility between the upper and lower rigid elements which is not subject to fatigue fracture due to constant flexing of the intermediate flexible section in use.

A further object of the invention resides in a device of the kind described employing novel and unique means whereby the flexible tubular section may be easily clamped to both the upper and lower rigid sections.

Other objects and advantages of this invention will become more apparent as the following description of an embodiment thereof progresses, reference being made to the accompanying drawing in which like reference characters are employed to designate like parts throughout the same.

In the drawings:

FIGURE 1 is a side elevation of the flexible filler tube construction illustrating the preferred form of my invention;

FIGURE 2 is a top plan view of the device shown in FIGURE 1;

FIGURE 3 is a vertical section as viewed on line 3—3 of FIGURE 2; and

FIGURE 4 is a view similar to that shown in FIGURE 3 but which illustrates a modified form of the invention.

In carrying out my invention, the illustrated embodiments of the same may be described as follows:

In FIGURES 1, 2 and 3 in which the preferred form is shown, the filler tube assembly comprises essentially upper and lower hollow rigid members and an intermediate hollow flexible member. As shown, the lower rigid member 1 is formed with an outturned annular flange 2 by which the assembly is supported over a filler opening 3 in the storage tank 4, bolts or other fastening means 5 being employed to anchor the assembly in position over the opening 3. The lower rigid member 1 carries a filter unit comprising a depending sleeve 6 spaced from the side of the opening and extending into the tank 4. An inverted filter cone 7 is secured in the lower end of the sleeve 6 to discharge the filtered liquid fuel into the tank.

The rigid member 1 is cylindrical and its upright wall terminates at its upper extremity in a downwardly opening annular channel 8, the downturned wall 9 forming a supporting wall for the filter unit sleeve 6 which is welded or otherwise secured to the wall 9.

The upper rigid unit of the assembly comprises a cylindrical wall having an opening 10′ defined by the inturned annular flange 11 at its upper open end to which is secured a reinforcing ring 12 by means of rivets or other fasteners 13. The opening 10′ is provided to receive a hose nozzle for delivering fluid into and through the tube assembly to a tank 4. The ring preferably is secured to the flange at its underside and overlies the same radially inwardly. The overlying portion of the ring is beveled as at 12′.

Pressure and vent tubes 14 and 15 are carried by the unit 10 and provide communication with the interior of the unit through the openings 16. The outer end portions of the tubes 14 and 15 are flared as at 17 to grip the end of a flexible tube passed thereover.

The flexible intermediate unit 18 is constructed preferably of rubber or other suitable material possessing flexibility and limited resiliency and consists of a tube having a relatively thick wall and formed about its upper and lower ends with outwardly disposed annular beads 19 and 20, respectively.

Annular spring clips 21 and 22 are welded or otherwise secured to the outer surface of the cylindrical upper and lower units, and include the rims 23 by which they are secured to the units, and outwardly extending resilient gripping portions 24 which are of channel form to receive the respective beads 19 and 20, as shown in FIGURE 3.

The unit 18 preferably is formed with a midsection 25 which is set or pre-formed and which forms an annular convex portion extending inwardly of the unit.

A limit strap 26 is anchored at its ends to the upper and lower rigid units to prevent accidental displacement or separation of the units and to limit the degree of separation.

The concavo-convex portion 25 of the intermediate unit having a permanent set localizes to a marked degree the area of flexing of the unit 18.

The cylindrical sleeve 6 may, of course, be formed of a screen or filter material whereby the liquid fuel discharged from a hose nozzle through the fluid-receiving opening 10′ in the top of the upper unit 10 may be discharged into the tank 4 at an increased rate over that when sleeve 6 is not formed of a mesh material and the only discharge into the tank is through the cone filter 7.

It will be seen that, by my construction as illustrated, the filler tube assembly incorporating an intermediate flexible section will be durable in use and will eliminate the destructive effects of fatigue fracture due to impact with other objects and vibration in use. Heretofore, filler tube assemblies constructed entirely of relatively rigid units, such as stainless steel, have been of short useful life due primarily to the effects of fatigue fractures set up in the metal under constant impact or vibration in use.

In FIGURE 4 is illustrated a modified form of my invention in which the intermediate flexible section or unit 30 is clamped in place at its ends, within the confines of the upper and lower unit cylindrical walls 31 and 32, respectively. More particularly, the clamping members 33 and 34 are welded at their rim portions 35 to the inner surfaces of the walls 31 and 32, respectively, the annular channels 36 formed in the clamping members 33 and 34 being adapted to receive the respective beads 37 of the flexible section and to clamp them in place against the inner surfaces of the walls 31 and 32, as shown. The section 30 is formed with a plurality of annular concavo-convex pre-set portions spaced apart as at 38, 39 and 40. In the illustration, the upper and lower portions 38 and 40, respectively, have their convex configuration projecting within the member 30 while the portion 39 has its convex configuration projecting outwardly of the member 30. In this form, the areas of flexing will be distributed along the member 30.

In all other respects the modified form of FIGURE 4 is similar in construction and operation to the preferred form of FIGURES 1, 2 and 3.

Various changes may be made in the details of construction and arrangement of parts of the invention without departing from the spirit thereof or the scope of the appended claims.

I claim:
1. A filler tube assembly for liquid storage containers comprising a lower rigid cylindrical section adapted to be secured over a filler opening of a storage container, an upper rigid cylindrical section having a nozzle receiving opening, and an intermediate flexible tubular section secured at its extremities respectively to said lower and upper sections, said intermediate section comprising a tube of resilient material, the walls of said tube being preformed to include concavo-convex areas between its ends, and means connecting said rigid sections and independent of the flexible section to limit the relative movement of said sections as in flexing the assembly.

2. A filler tube assembly for liquid storage containers comprising a lower rigid cylindrical section adapted to be secured over a filler opening of a storage container, an upper rigid cylindrical section having a nozzle receiving opening, an intermediate flexible tubular section secured at its extremities respectively to said lower and upper sections, said intermediate section being formed with a bead located circumferentially around each of its end portions, a clamping member on said upper rigid section, and a clamping member on said lower rigid section, said clamping members each encompassing one of said beads to secure the three sections together as a unit, the wall defining said intermediate flexible tubular section having a circumferential area of concavo convex form located between the beaded end portions of said section, and a limit strap anchored at its ends to the said upper and lower rigid sections to permit limited relative movement of said rigid units.

References Cited in the file of this patent
UNITED STATES PATENTS

| | | |
|---|---|---|
| 576,702 | True | Feb. 9, 1897 |
| 1,851,342 | Bacher | Mar. 29, 1932 |
| 2,025,067 | Miller | Dec. 24, 1935 |
| 2,561,578 | Koester | July 24, 1951 |
| 2,808,972 | Flugge et al. | Oct. 8, 1957 |